US012139208B2

(12) United States Patent
Fujimoto

(10) Patent No.: US 12,139,208 B2
(45) Date of Patent: Nov. 12, 2024

(54) ELECTRICALLY-OPERATED DRIVE DEVICE AND ELECTRICALLY-OPERATED POWER STEERING DEVICE

(71) Applicant: HITACHI ASTEMO, LTD., Hitachinaka (JP)

(72) Inventor: Masao Fujimoto, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 873 days.

(21) Appl. No.: 17/283,475

(22) PCT Filed: Oct. 23, 2019

(86) PCT No.: PCT/JP2019/041457
§ 371 (c)(1),
(2) Date: Apr. 7, 2021

(87) PCT Pub. No.: WO2020/090568
PCT Pub. Date: May 7, 2020

(65) Prior Publication Data
US 2022/0009544 A1    Jan. 13, 2022

(30) Foreign Application Priority Data

Oct. 31, 2018  (JP) .................. 2018-204592

(51) Int. Cl.
*H02K 5/22* (2006.01)
*B62D 5/04* (2006.01)
*H02K 11/33* (2016.01)

(52) U.S. Cl.
CPC ........... *B62D 5/0406* (2013.01); *H02K 5/225* (2013.01); *H02K 11/33* (2016.01)

(58) Field of Classification Search
CPC .......... H02K 5/22; H02K 5/225; H02K 11/30; H02K 11/33; B62D 5/0406
See application file for complete search history.

(56) References Cited

U.S. PATENT DOCUMENTS 10,554,100 B2   2/2020  Hamada
2015/0115755 A1*  4/2015  Yamasaki ............. H02K 5/15
                                          310/71

(Continued)

FOREIGN PATENT DOCUMENTS

JP   2002345211 A  * 11/2002  ............ H02K 17/32
JP   2008-148394 A    6/2008
(Continued)

OTHER PUBLICATIONS

Tominaga, Machine Transaltion of JP2002345211, Nov. 2002 (Year: 2002).*

(Continued)

*Primary Examiner* — Eric Johnson
(74) *Attorney, Agent, or Firm* — Foley & Lardner LLP

(57) ABSTRACT

An electric power steering device includes a motor housing of an electric motor. The motor housing includes an end face part opposite to an output part of a rotating shaft of the electric motor. An electronic control part is arranged at the end face part. A connector assembly is arranged on a side of the electronic control part opposite to a side of the electronic control part that faces the end face part. A metal cover for the electronic control part includes a bottom part and a lateral peripheral part. The bottom part includes: an exposure hole through which an external terminal forming part is exposed to outside; and an annular reinforcing projecting portion formed at an edge of the exposure hole. The lateral peripheral part is angled from the bottom part, and forms an opening through which the lateral peripheral part is fixed to the end face part.

8 Claims, 12 Drawing Sheets

(56) References Cited

U.S. PATENT DOCUMENTS

2018/0178829 A1\* 6/2018 Fujimoto ............. H02K 11/215
2019/0300047 A1 10/2019 Hamada
2019/0372418 A1\* 12/2019 Ogawa ..................... H02K 5/10

FOREIGN PATENT DOCUMENTS

JP    2017-216838 A    12/2017
JP    2018-082514 A    5/2018
WO   WO-2017154498 A1 \*  9/2017   ........... B62D 5/0403

OTHER PUBLICATIONS

U.S. Appl. No. 17/290,485, filed Apr. 30, 2021, Hitachi Astemo, Ltd.
International Search Report dated Dec. 3, 2019 issued in International Application No. PCT/JP2019/041457, 3 pages.
Written Opinion of the International Searching Authority dated Dec. 3, 2019 issued in International Application No. PCT/JP2019/041457, with English translation, 9 pages.

\* cited by examiner

ELECTRICALLY-OPERATED DRIVE DEVICE AND ELECTRICALLY-OPERATED POWER STEERING DEVICE

CROSS-REFERENCE TO RELATED APPLICATIONS

The present application is a 371 of PCT/JP2019/041457 filed Oct. 23, 2019, which is based upon and claims priority to Japanese patent application 2018-204592 filed on Oct. 31, 2018, both of which are incorporated herein by reference in their entireties.

TECHNICAL FIELD

The present invention relates generally to an electric drive device and an electric power steering device, and particularly to an electric drive device and an electric power steering device in which an electronic control unit is mounted.

BACKGROUND ART

In a general field of industrial machinery, a controlled object of a mechanical system is driven by an electric motor. In recent years, employment of an electric drive device of mechatronical integration type has been started, wherein the electric drive device includes both of an electric motor and an electronic control unit in a package, and wherein the electronic control unit includes semiconductor elements and others for controlling rotational speed and torque of the electric motor.

As an example of electric drive device of mechatronical integration type, an electric power steering device for an automotive vehicle includes an electric motor, and an electronic control unit (ECU) for controlling the electric motor, wherein the electronic control unit is configured to sense a direction and a torque of rotation of a steering shaft rotated by driver's operation of a steering wheel, and drive the electric motor based on these sensed values, to produce a steering assist torque to rotate the steering shaft in the direction of rotation of the steering shaft.

A patent document 1 discloses a known conventional electric power steering device composed of an electric motor section and an electronic control section. In the electric motor section, an electric motor is housed in a motor housing, wherein the motor housing has a cylindrical part made of an aluminum alloy or the like. In the electronic control section, a control board provided with electrical components is attached to an end face wall of the motor housing that is opposite to an output shaft in an axial direction of the motor housing, wherein the end face wall serves as a heat sink.

The board attached to the end face wall is provided with a power supply circuit part, a power conversion circuit part, and a control circuit part, wherein the power conversion circuit part includes power switching elements such as MOSFETs or IGBTs for driving and controlling the electric motor, and wherein the control circuit part is configured to control the power switching elements. Output terminals of the power switching elements and input terminals of the electric motor are connected electrically via a bus bar.

The electronic control part attached to the end face wall is supplied with electric power from a power supply via a connector assembly made of synthetic resin, and also supplied with a sensing signal indicating operating states and others from sensors and others. The connector assembly includes an external terminal forming part that is exposed to the outside through an exposure hole formed in a metal cover, and is connected to a connector not shown and connected to the power supply (battery) and sensors.

The metal cover is made of metal to have a bottomed tubular shape with one end open, and includes a bottom side formed with the exposure hole through which the external terminal forming part is exposed, and includes an open side fixed to the end face wall of the motor housing by an adhesive or bolts.

Other known examples of electric drive device where an electronic control device is integrally provided include an electric brake device, and an electric hydraulic pressure control device for control of various hydraulic pressures. The following describes an electric power steering device as a representative example.

PRIOR ART DOCUMENT(S)

Patent Document(s)

Patent Document 1: JP 2017-216838 A

SUMMARY OF INVENTION

Problem(s) to be Solved by the Invention

In the electric power steering device described in patent document 1 (particularly, see FIG. 3), the external terminal forming part of the connector assembly is exposed to the outside through the exposure hole formed in the bottom part of the metal cover. Specifically, as shown in FIGS. 14 and 15 attached hereto, in a metal cover 60, a bottom part 62 is formed at one end of a lateral peripheral part 61 with an exposure hole 63 through which an external terminal forming part of a connector assembly is exposed to the outside.

Exposure hole 63 is formed by punching the bottom part 62, wherein a peripheral edge portion 63C of exposure hole 63 is formed in a plane where bottom part 62 is formed. Furthermore, an opening 64 is formed on the opposite side of bottom part 62, is fixed to the end face wall of the motor housing.

For cost reduction and weight reduction, it is required to reduce the plate thickness of metal cover 60. However, metal cover 60 is often subject to an external force during a process of assembling the metal cover 60 and during a process of use. Therefore, if the plate thickness of metal cover 60 is small, peripheral edge portion 63C of exposure hole 63 and its surroundings are likely to be deformed, and metal cover 60 may be further deformed entirely. Such deformation may disable a function of liquid tightness between exposure hole 63 of metal cover 60 and the connector assembly, or a function of liquid tightness between opening 64 of metal cover 60 and the end face wall of the motor housing.

In view of the foregoing, there is a demand for an electric drive device and an electric power steering device with which those problems are solved.

It is an object of the present invention to provide a novel electric drive device and a novel electric power steering device in which thickness of a metal cover is reduced, and mechanical strength of surroundings of an exposure hole formed in a bottom part of the metal cover is enhanced to suppress deformation of the metal cover.

Means for Solving the Problem(s)

According to the present invention, it includes: a motor housing structured to house an electric motor, wherein the motor housing includes an end face part opposite to an output part of a rotating shaft of the electric motor, and wherein the electric motor is structured to drive a controlled object of a mechanical system; an electronic control part arranged at the end face part of the motor housing; a connector assembly arranged on a side of the electronic control part opposite to a side of the electronic control part that faces the end face part of the motor housing; and a metal cover structured to cover the electronic control part from outside, wherein the metal cover includes: a bottom part including: an exposure hole through which an external terminal forming part is exposed to outside; and an annular reinforcing projecting portion formed at an edge of the exposure hole; and a lateral peripheral part angled from the bottom part, and forming an opening through which the lateral peripheral part is fixed to the end face part of the motor housing.

Effect(s) of the Invention

According to the present invention, the feature that the annular reinforcing projecting portion is formed at the edge of the exposure hole formed in the bottom part of the metal cover, serves to enhance the mechanical strength of the surrounding region of the exposure hole, and thereby suppress the deformation of the metal cover.

MODE(S) FOR CARRYING OUT INVENTION

The following details an embodiment of the present invention with reference to the drawings. However, the present invention is not limited to the embodiment, but includes various modifications and applications belonging to technical conception of the present invention.

Figure 1:
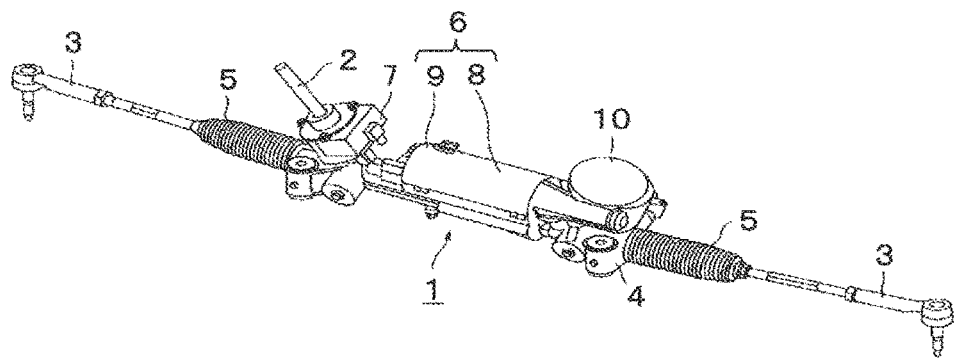
FIG. 1 is a whole perspective view of a steering device as an example of device to which the present invention is applied.

The following briefly describes configuration of a steering device as an example of device to which the present invention is applied, with reference to FIG. 1, prior to description of the embodiment of the present invention.

First, the following describes a steering device for steering front wheels of an automotive vehicle. Steering device 1 is configured as shown in FIG. 1. A steering shaft 2 is connected to a steering wheel not shown, and includes a lower end formed with a pinion not shown, wherein the pinion is in mesh with a rack not shown, wherein the rack extends in a vehicle body lateral direction. The rack includes ends linked to respective tie rods 3 for steering the front wheels leftward and rightward, and is housed by a rack housing 4. A rubber boot 5 is provided between rack housing 4 and each tie rod 3.

An electric power steering device 6 is provided for producing an assist torque while the steering wheel is being turned. Specifically, electric power steering device 6 includes a torque sensor 7, an electric motor section 8, and an electronic control section or unit (ECU) 9, wherein torque sensor 7 is structured to sense a direction of rotation of steering shaft 2, and a rotating torque applied to steering shaft 2, wherein electric motor section 8 is structured to apply a steering assist force to the rack via a gear 10 depending on a sensed value from torque sensor 7, and wherein electronic control section 9 is configured to control an electric motor arranged in electric motor section 8.

Electric motor section 8 of electric power steering device 6 is connected to gear 10 by screws not shown at three spots of an outer peripheral part of an output shaft side of electric motor section 8. Electronic control section 9 is arranged at a side of electric motor section 8 opposite to an output shaft of electric motor section 8.

Electric power steering device 6 operates as follows. As the steering wheel is turned to rotate steering shaft 2 in one direction, torque sensor 7 then senses the direction of rotation of steering shaft 2, and the rotating torque applied to steering shaft 2. A control circuit part calculates a quantity of operation of the electric motor, based on a sensed value from torque sensor 7.

Power switching elements of a power conversion circuit part are controlled to drive the electric motor based on the calculated quantity of operation, so that the output shaft of the electric motor is rotated to drive the steering shaft 2 in the same direction as the direction of operation of the steering wheel. The rotation of the output shaft of the electric motor is transferred to the rack via the pinion and gear 10, thereby steering the automotive vehicle. Further description is omitted because its configuration and operation are well known.

Figure 14:
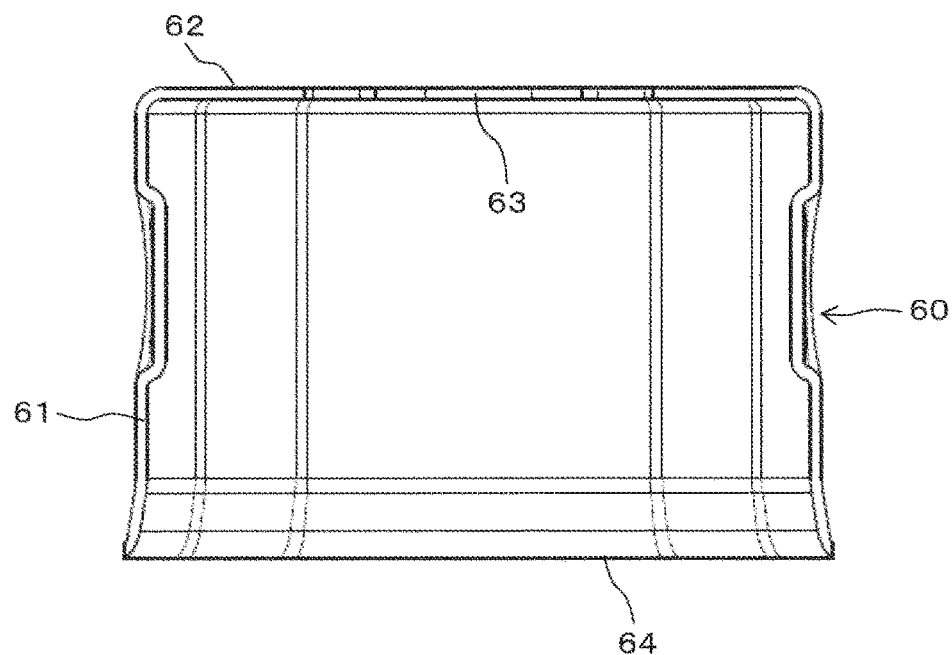
FIG. 14 is a sectional view of a metal cover employed by a conventional electric power steering device.
Figure 15:
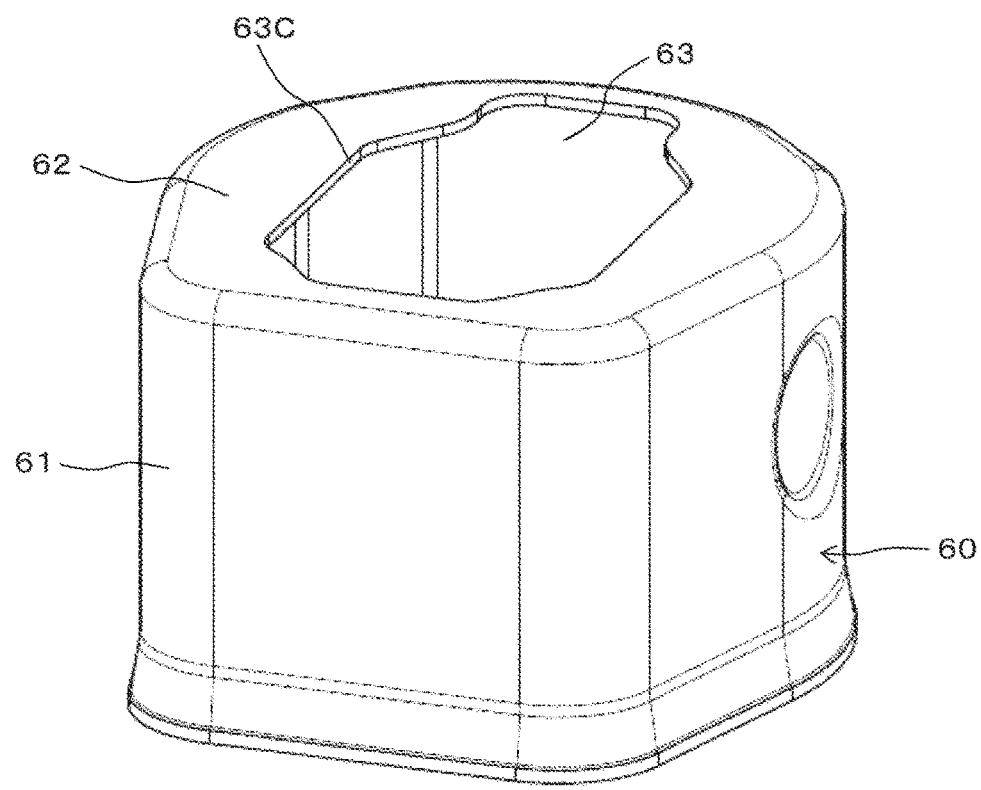
FIG. 15 is a perspective view of the metal cover shown in FIG. 14 from diagonally above.

As described above, in the electric power steering device as configured in patent document 1, the external terminal forming part of the connector assembly is exposed through exposure hole 63 formed in bottom part 62 of metal cover 60, as shown in FIGS. 14 and 15. Exposure hole 63 is formed by punching the bottom part 62, wherein peripheral edge portion 63C of exposure hole 63 is formed in the plane where bottom part 62 is formed. For cost reduction and weight reduction, it is required to reduce the plate thickness of metal cover 60. However, if the plate thickness of metal cover 60 is small, peripheral edge portion 63C of exposure hole 63 and its surroundings are likely to be deformed, and metal cover 60 may be further deformed entirely.

In view of the foregoing background, according to the present embodiment, an electric power steering device is proposed which is configured as follows.

According to the present embodiment: an electric power steering device includes: a motor housing including an end face part opposite to an output part of a rotating shaft of an electric motor; an electronic control part arranged at the end face part of the motor housing; a connector assembly arranged on a side of the electronic control part opposite to a side of the electronic control part that faces the end face part of the motor housing; an annular seal accommodating portion formed around an external terminal forming part of the connector assembly, and filled with a liquid sealing agent; and a metal cover structured to cover the electronic control part from outside, wherein the metal cover includes: a bottom part including: an exposure hole through which the external terminal forming part is exposed to outside; and an annular reinforcing projecting portion formed at an edge of the exposure hole, and accommodated in the annular seal accommodating portion; and a lateral peripheral part angled from the bottom part, and forming an opening through which the lateral peripheral part is fixed to the end face part of the motor housing.

According to the foregoing, the feature that the annular reinforcing projecting portion is formed at the edge of the exposure hole formed in the bottom part of the metal cover, serves to enhance the mechanical strength of the surrounding region of the exposure hole, and thereby suppress the deformation of the metal cover. Furthermore, the liquid sealing agent filled between the annular reinforcing projecting portion and the annular seal accommodating portion ensures liquid tightness.

The following details specific configuration of the electric power steering device according to the embodiment of the present invention with reference to FIGS. 2 to 13.

Figure 2:
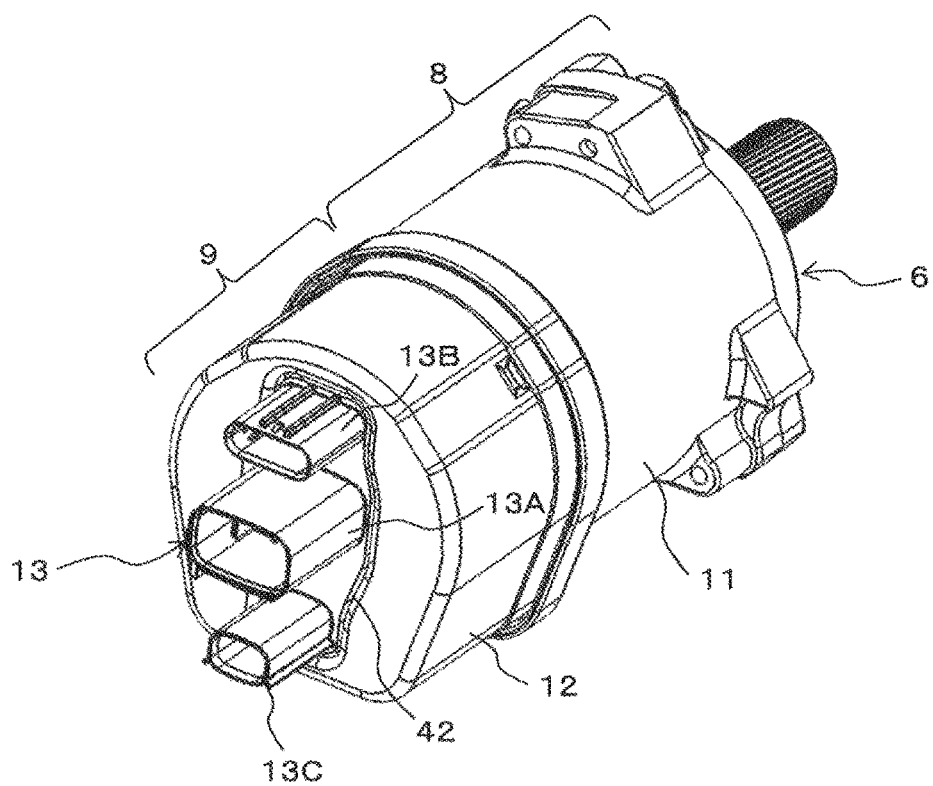
FIG. 2 is a whole perspective view of an electric power steering device according to an embodiment of the present invention.
Figure 3:
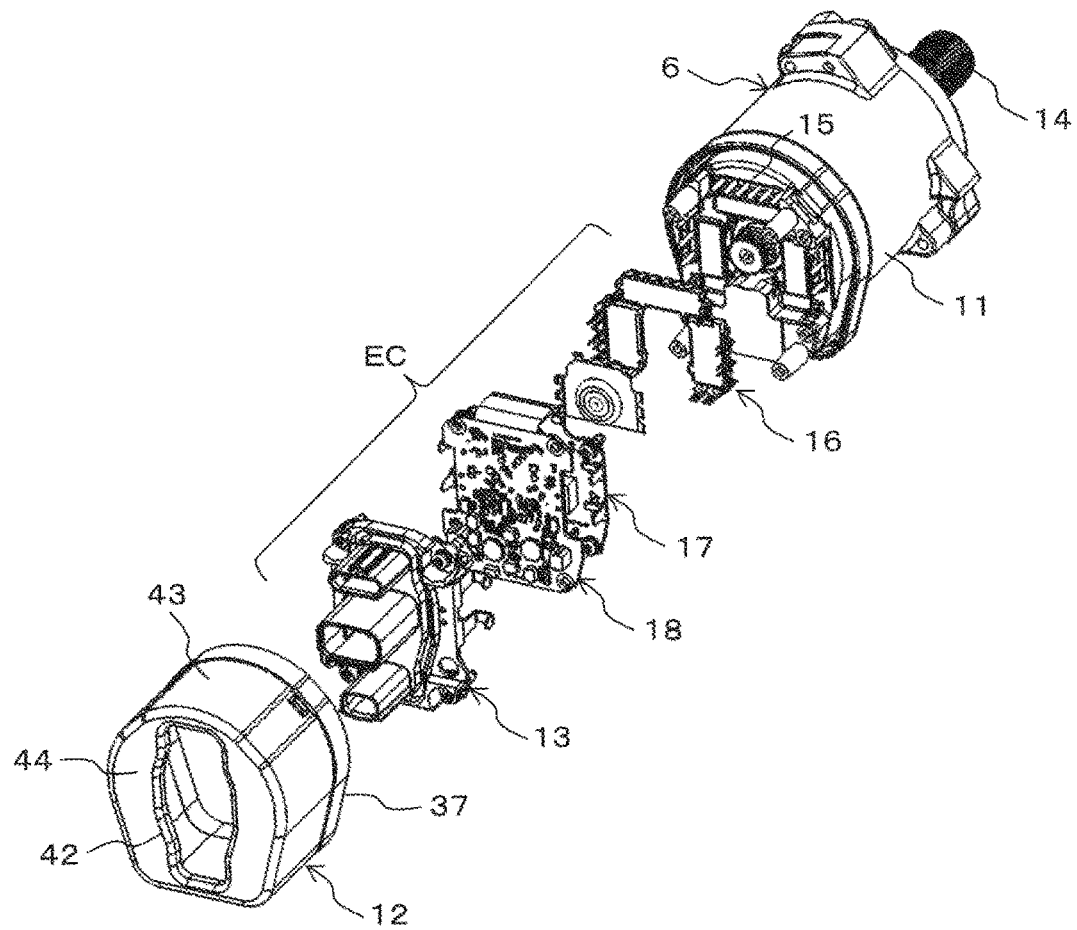
FIG. 3 is an exploded perspective view of the electric power steering device shown in FIG. 2.

FIG. 2 shows whole configuration of the electric power steering device according to the present embodiment. FIG. 3 shows components of the electric power steering device shown in FIG. 2 in disassembled state as viewed diagonally. FIGS. 4 to 9 show states of assembling when the components are assembled in an assembling order.

Figure 10:
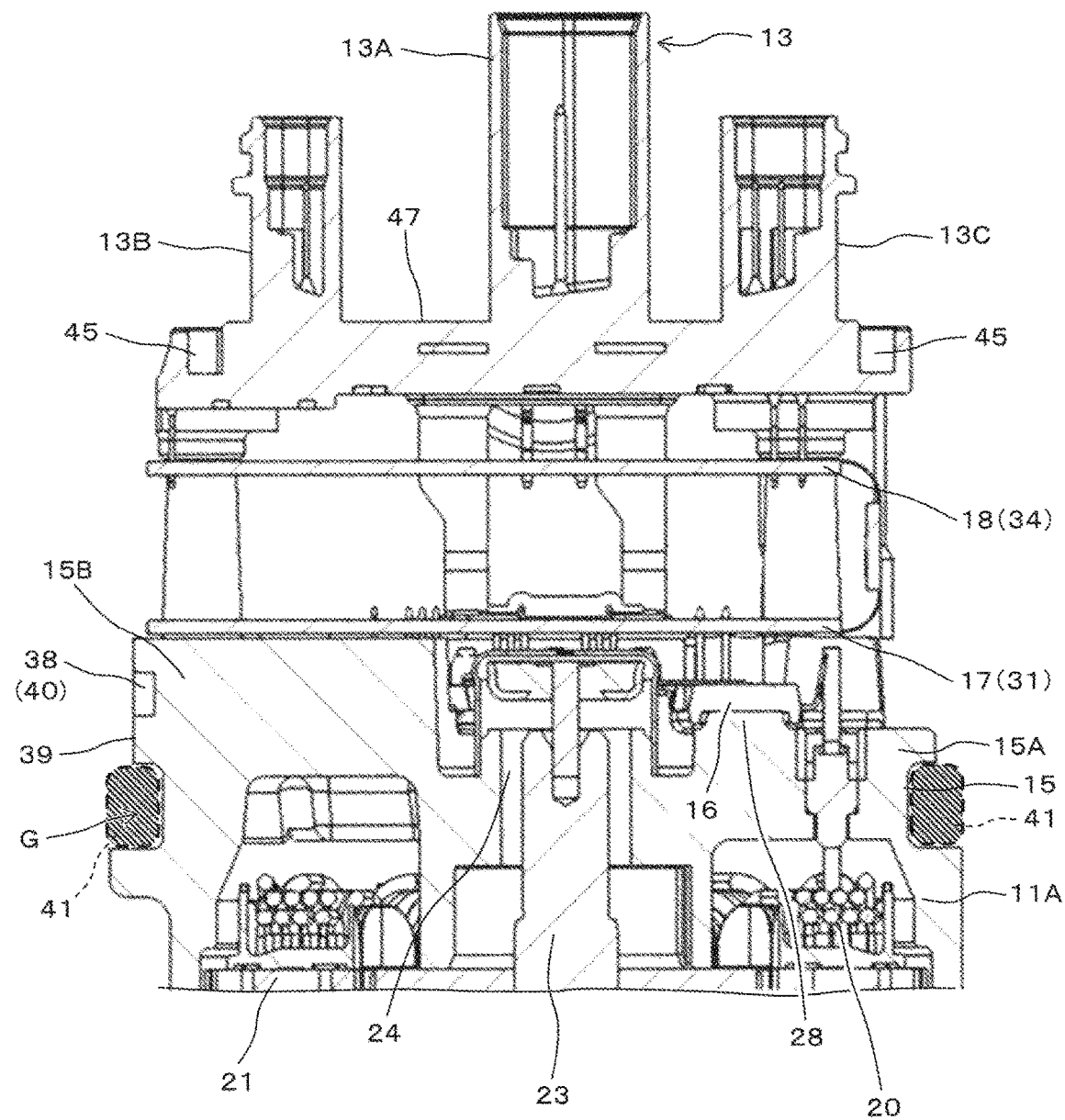
FIG. 10 is an enlarged sectional view of an electronic control section and its surroundings.
Figure 11:
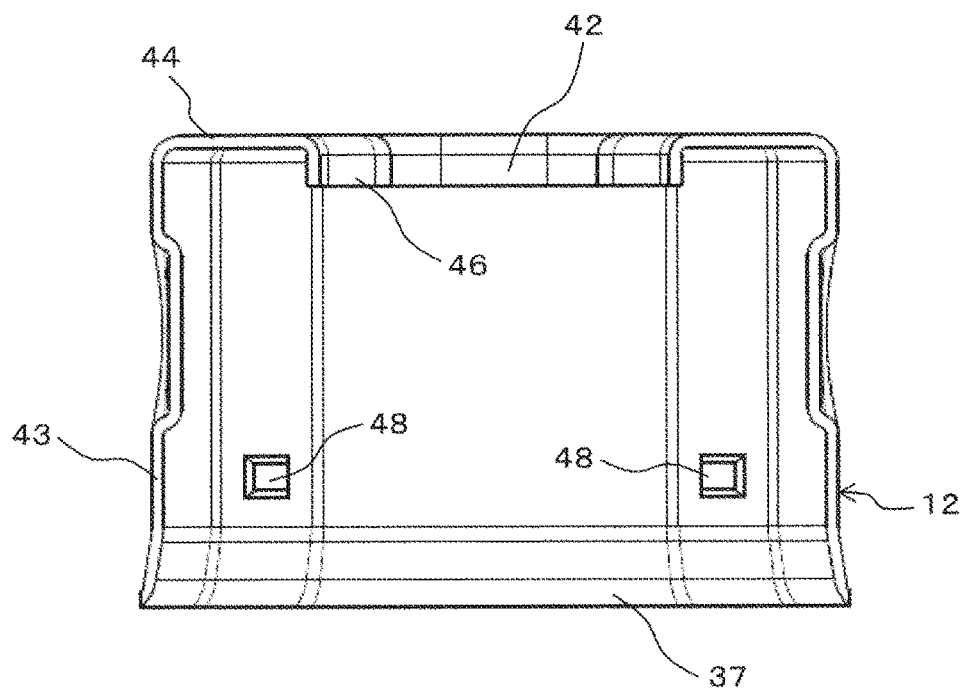
FIG. 11 is sectional view of a metal cover according to the embodiment of the present invention.
Figure 12:
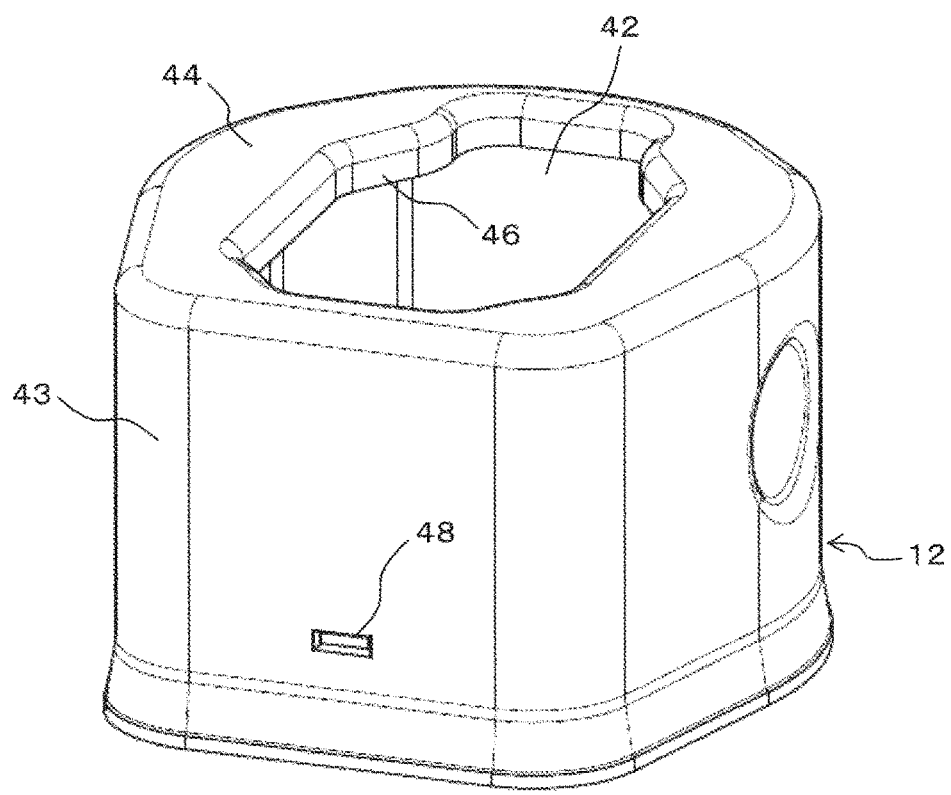
FIG. 12 is a perspective view of the metal cover shown in FIG. 11 from diagonally above.
Figure 13:
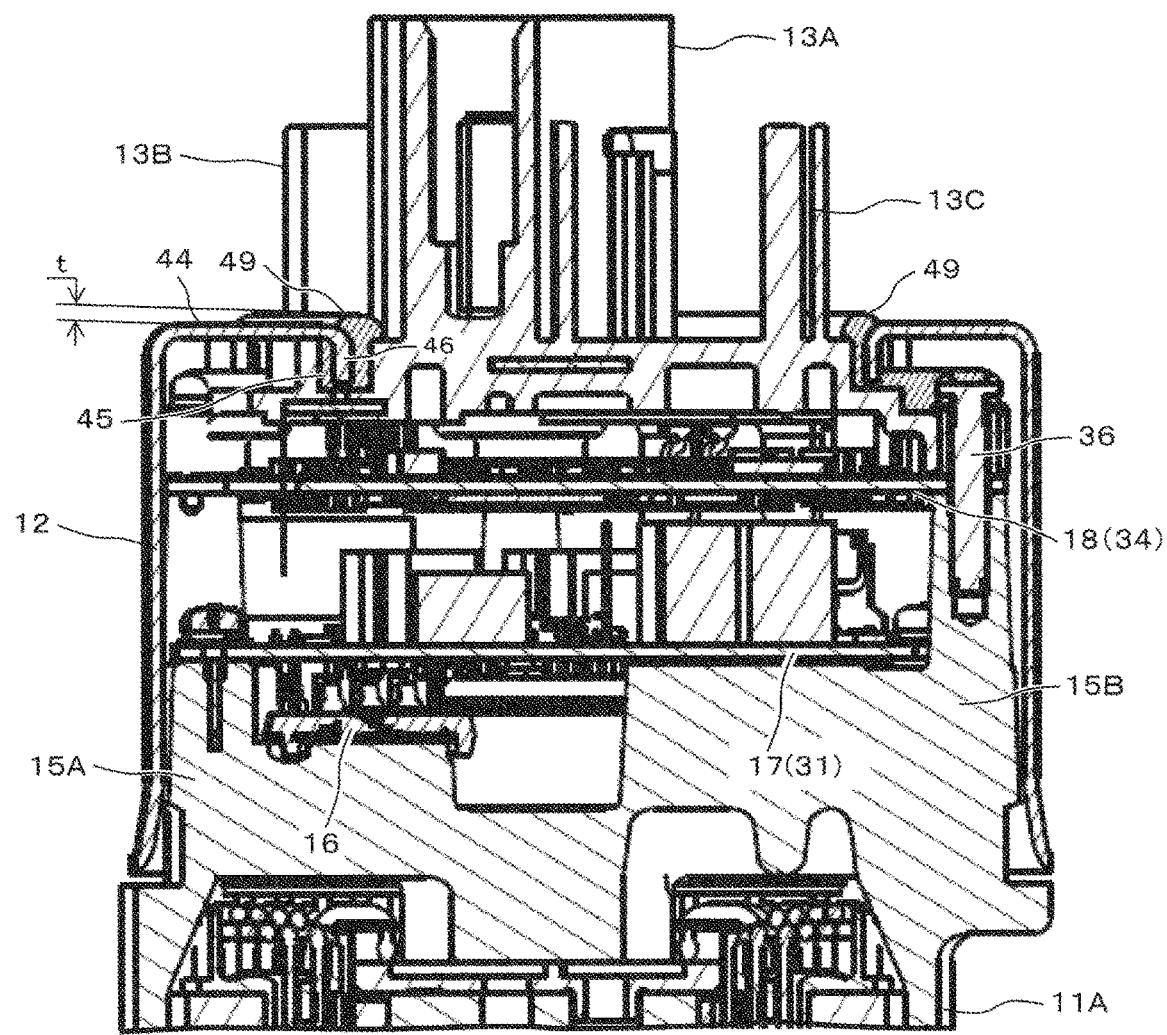
FIG. 13 is an enlarged sectional view of the electronic control section and its surroundings when the metal cover according to the embodiment of the present invention is attached.

FIG. 10 is a sectional view of the electronic control section of the electric power steering device. FIG. 11 is a sectional view of the metal cover. FIG. 12 shows the metal cover as viewed diagonally from above. FIG. 13 is a sectional view of the electronic control section of the electric power steering device when the metal cover is attached. The following description refers to these drawings as appropriate.

As shown in FIG. 2, the electric power steering device includes electric motor section 8 and electronic control section 9. Electric motor section 8 includes a motor housing 11 and an electric motor not shown. Motor housing 11 includes a cylindrical part made of an aluminum-based metal such as aluminum or an aluminum alloy. The electric motor is housed in motor housing 11. Electronic control section 9 includes a metal cover 12, and an electronic control assembly not shown housed in metal cover 12. Metal cover 12 is made of an aluminum-based metal such as aluminum or an aluminum alloy, or an iron-based metal, and is arranged at a side of motor housing 11 opposite to the output shaft in the axial direction.

Motor housing 11 and metal cover 12 are fixed to each other by swaging in their fixing regions each extending circumferentially in the periphery of the end face part facing each other. Metal cover 12 includes an accommodation space inside thereof, which accommodates the electronic control assembly. The electronic control assembly includes a power supply circuit part for supplying electric power as required, and a power conversion circuit part having power switching elements such as MOSFETs or IGBTs for driving and controlling the electric motor of electric motor section 8, and a control circuit part for controlling the power switching elements. Output terminals of the power switching elements and input terminals of a coil of the electric motor are connected electrically via a bus bar.

At an end face of metal cover 12 opposite to motor housing 11, a part of a connector assembly 13 is exposed through an exposure hole 42 formed in metal cover 12. Connector assembly 13 is fixed by screws to fixing parts of motor housing 11. The part of connector assembly 13 includes an external terminal forming part 13A for power supply, an external terminal forming part 13B for sensors, and an external terminal forming part 13C for sending a state of control to external devices.

The electronic control assembly housed in metal cover 12 is supplied with electric power from a power supply via the external terminal forming part 13A made of synthetic resin, and is supplied with sensing signals indicative of operating states from sensors and others via the external terminal forming part 13B, and sends a present control state of the electric power steering device via the external terminal forming part 13C.

FIG. 3 shows electric power steering device 6 in an exploded perspective view. Inside of motor housing 11, a side yoke not shown is fitted, wherein the side yoke has an annular shape and is made of iron. The electric motor not shown is mounted inside of the side yoke. The electric motor includes an output part 14 structured to apply a steering assist force to the rack via the gear. Description of specific configuration of the electric motor is omitted because it is well known.

Motor housing 11 is made of an aluminum alloy, thereby serving as a heat sink member for dissipating heat to outside atmosphere, wherein the heat is generated by the electric motor, the power conversion circuit part and the power supply circuit part described below. The electric motor and motor housing 11 form the electric motor section 8.

Electronic control part EC is attached to an end face part 15 of motor housing 11 opposite to the output part 14 of the electric motor section 8. Electronic control part EC is composed of power conversion circuit part 16, power supply circuit part 17, control circuit part 18, and connector assembly 13. The end face part 15 of motor housing 11 is formed integrally with motor housing 11, but may be formed separately from motor housing 11 and screwed or welded to motor housing 11.

Power conversion circuit part 16, power supply circuit part 17, and control circuit part 18 are configured to be redundant and form a main electronic control system and an auxiliary electronic control system. Normally, the main electronic control system is employed to drive and control the electric motor, and when an abnormality or failure occurs in the main electronic control system, the control is switched from the main electronic control system to the auxiliary electronic control system so that the auxiliary electronic control system drives and controls the electric motor. Accordingly, as detailed below, heat of the main electronic control system is normally transferred to motor housing 11. When the main electronic control system is failed or abnormal, operation of the main electronic control system is stopped and the auxiliary electronic control system is activated so that heat of the auxiliary electronic control system is transferred to motor housing 11.

However, although not adopted by the present embodiment, there is an alternative configuration that both of the main and auxiliary electronic control systems are simultaneously employed to form a normal electronic control system, and when one of the main and auxiliary electronic control systems is failed or abnormal, only the other electronic control system is employed to drive and control the electric motor with half of full performance. This ensures a power steering function, although the performance of the electric motor is only half. Accordingly, the heat of the main electronic control system and the auxiliary electronic control system is normally transferred to motor housing 11.

Power conversion circuit part 16, power supply circuit part 17, control circuit part 18, and connector assembly 13, which form the electronic control part EC, are arranged in this order away from end face part 15 of motor housing 11. Control circuit part 18 is configured to generate control signals for driving the switching elements of power conversion circuit part 16, and includes a microcomputer and a peripheral circuit.

Power supply circuit part 17 is configured to supply electric power to drive the control circuit part 18, and supply electric power to power conversion circuit part 16, and includes capacitors, coils, switching elements, and others. Power conversion circuit part 16 is configured to regulate electric power flowing through the coil of the electric motor, and includes switching elements and others forming three-phase upper and lower arms.

In electronic control part EC, power conversion circuit part 16 and power supply circuit part 17 generate more quantities of heat than others. The generated heat of power conversion circuit part 16 and power supply circuit part 17 is dissipated via motor housing 11 made of the aluminum alloy. This configuration is detailed below with reference to FIGS. 4 to 9.

Connector assembly 13, which is made of synthetic resin, is arranged between control circuit part 18 and metal cover 12, and is connected to a vehicle battery (power supply) and external control devices not shown. Connector assembly 13 is also connected to power conversion circuit part 16, power supply circuit part 17, and control circuit part 18.

Metal cover 12 functions to house and seal liquid-tightly the power conversion circuit part 16, power supply circuit part 17, and control circuit part 18. In the present embodiment, metal cover 12 is fixed to motor housing 11 by swaging.

Metal cover 12 includes a lateral peripheral part 43, and a bottom part 44 formed by bending from one end of lateral peripheral part 43. Bottom part 44 is formed with exposure hole 42 through which external terminal forming parts 13A, 13B, 13C of connector assembly 13 are exposed to the outside. Metal cover 12 includes an open end 37 opposite to bottom part 44, wherein open end 37 is engaged with end face part 15 of motor housing 11.

Figure 4:
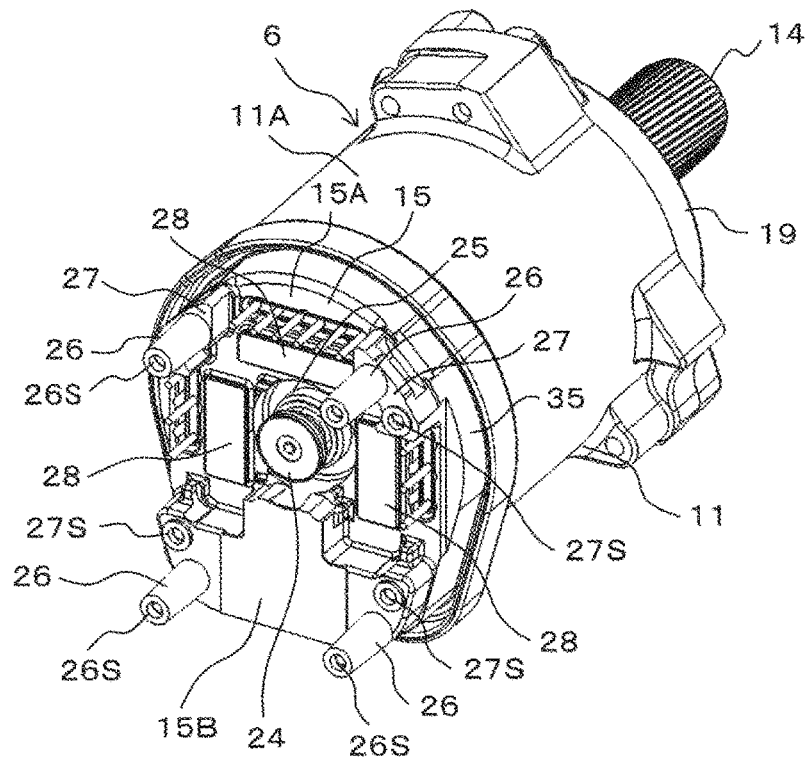
FIG. 4 is a perspective view of a motor housing shown in FIG. 3.
Figure 5:
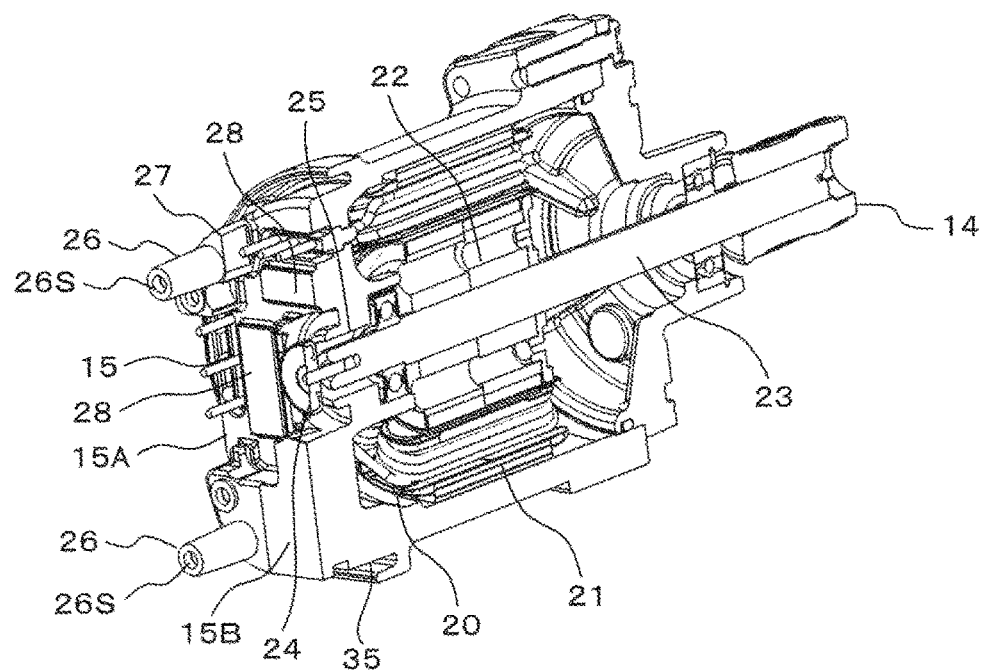
FIG. 5 is a cutaway view of the motor housing shown in FIG. 4, where the motor housing is cut by a plane containing a central axis of the motor housing.

The following describes configuration of the components and a process of assembling the components with reference to FIGS. 4 to 9. FIG. 4 shows an exterior view of motor housing 11, and FIG. 5 shows its axial sectional view.

As shown in FIGS. 4 and 5, motor housing 11 is cylindrically shaped and includes a lateral peripheral part 11A, end face part 15, and a cover 19. The end face part 15 closes a first end of lateral peripheral part 11A, whereas the cover 19 closes a second end of lateral peripheral part 11A. In the present embodiment, lateral peripheral part 11A and end face part 15 are formed integrally such that motor housing 11 has a cylindrical shape having a bottom. The cover 19 serves a covering function to close the second end of lateral peripheral part 11A after the electric motor is mounted inside the lateral peripheral part 11A.

Figure 9:
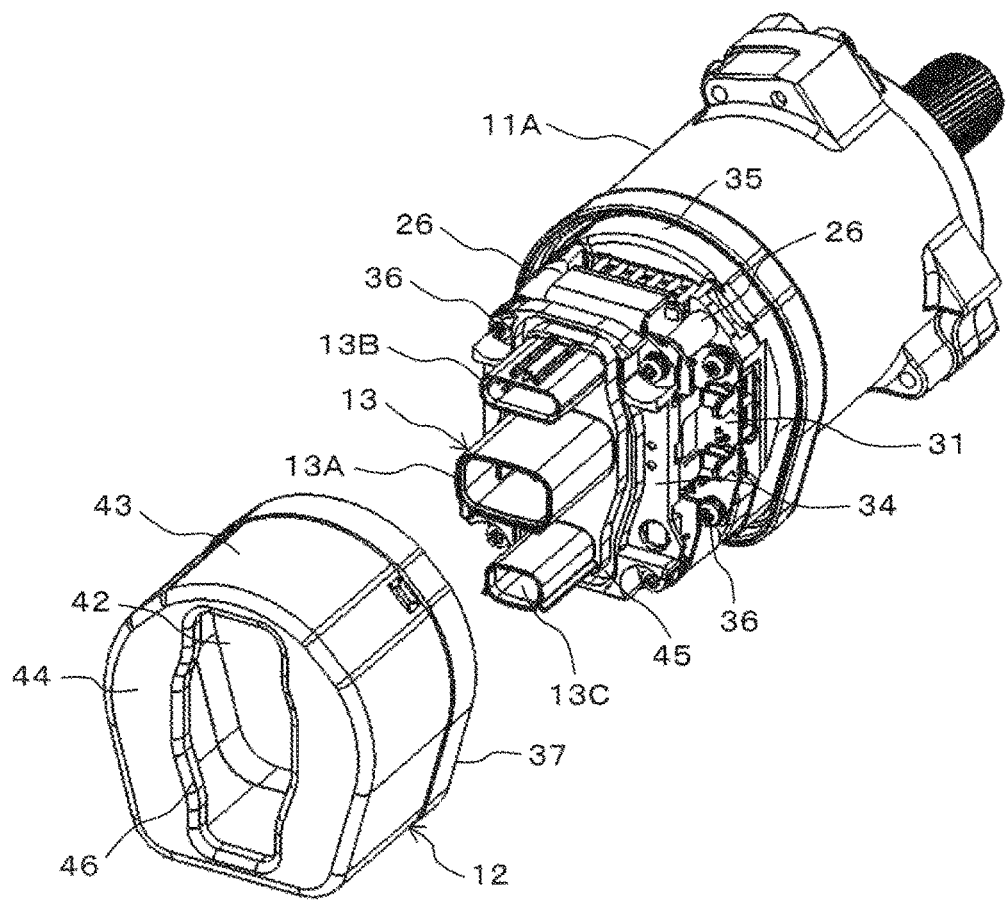
FIG. 9 is a perspective view of the motor housing shown in FIG. 8 where a connector assembly is mounted and fixed to the motor housing.

The peripheral surface of end face part 15 is formed with an annular step portion 35 whose diameter is reduced inward in the radial direction, wherein open end 37 of metal cover 12 shown in FIG. 9 is engaged with step portion 35. The fixation between the side wall of end face part 15 and open end 37 of the metal cover 12 is implemented by so-called swaging fixation.

As shown in FIG. 5, a stator 21 is fitted inside the lateral peripheral part 11A of motor housing 11, wherein stator 21 is formed by winding the coil 20 around an iron core. A rotor 22 is rotatably mounted inside the stator 21, wherein a permanent magnet is embedded in rotor 22. A rotating shaft 23 is fixed to rotor 22. One end of rotating shaft 23 forms the output part 14, whereas the other end of rotating shaft 23 forms a rotation-sensing target part 24 serving as a target for sensing the rotational phase and speed of rotating shaft 23.

Rotation-sensing target part 24 is provided with the permanent magnet, extending through a through hole 25 formed in end face part 15, and projecting to the outside. The rotational phase and speed of rotating shaft 23 is sensed by a magnetic sensor such as a GMR element or the like not shown.

Referring back to FIG. 4, the surface of end face part 15 opposite to the output part 14 of rotating shaft 23 is formed with a heat dissipation region 15A for power conversion circuit part 16 (see FIG. 3) and a heat dissipation region 15B for power supply circuit part 17 (see FIG. 3). Four corners of end face part 15 are each formed integrally with a board-fixing projecting part 26 extending perpendicularly from end face part 15. Each board-fixing projecting part 26 is formed with a screw hole 26S inside. Board-fixing projecting parts 26 are structured to fix a board of control circuit part 18 described below and connector assembly 13. Each board-fixing projecting part 26 projecting from power conversion heat dissipation region 15A described below is formed with a board-receiving part 27 having the same height as power supply heat dissipation region 15B described below in the axial direction. Each board-receiving part 27 is structured to mount and fix a glass epoxy board 31 of power supply circuit part 17 described below.

The flat area forming the end face part 15 and extending in the radial direction and perpendicular to rotating shaft 23 is divided into two regions, namely, power conversion heat dissipation region 15A and power supply heat dissipation region 15B. Power conversion circuit part 16, which is composed of switching elements such as MOSFETs, is attached to power conversion heat dissipation region 15A. Power supply circuit part 17 is attached to power supply heat dissipation region 15B. In the present embodiment, the area of power conversion heat dissipation region 15A is set larger than that of power supply heat dissipation region 15B. This serves to ensure more space for mounting the power conversion circuit part 16, because the redundant system is employed.

A step is provided between power conversion heat dissipation region 15A and power supply heat dissipation region 15B such that power conversion heat dissipation region 15A and power supply heat dissipation region 15B have different heights in the axial direction (the direction in which rotating shaft 23 extends). Namely, power supply heat dissipation region 15B is formed with an outward step away with respect to power conversion heat dissipation region 15A in the axial direction of rotating shaft 23 of the electric motor. This step is set to have a height enough to prevent interference between power conversion circuit part 16 and power supply circuit part 17 when power supply circuit part 17 is assembled after power conversion circuit part 16 is assembled.

Power conversion heat dissipation region 15A is formed with three heat dissipation projecting parts 28. Heat dissipation projecting parts 28 are configured to mount power conversion circuit part 16 thereon, wherein power conversion circuit part 16 is configured to be redundant as described below. Each heat dissipation projecting part 28 projects away from the electric motor in the direction of rotating shaft 23 of the electric motor.

Power supply heat dissipation region 15B is generally flat and is configured to mount power supply circuit part 17 thereon, where power supply circuit part 17 is described below. Accordingly, each heat dissipation projecting part 28 serves as a heat dissipation portion to transfer heat from power conversion circuit part 16 to end face part 15, whereas power supply heat dissipation region 15B serves as a heat dissipation portion to transfer heat from power supply circuit part 17 to end face part 15.

Each heat dissipation projecting part 28 may be omitted so that power conversion heat dissipation region 15A serves as a heat dissipation portion to transfer heat from power conversion circuit part 16 to end face part 15. However, in the present embodiment, a metal board of power conversion circuit part 16 is securely fixed to heat dissipation projecting part 28 by friction stir welding.

At end face part 15 of motor housing 11 according to the present embodiment described above, the axial size can be made compact because there is no heat sink member. Moreover, since motor housing 11 has a sufficient thermal capacity, the heat generated in power supply circuit part 17 and power conversion circuit part 16 can be dissipated to the outside effectively.

Figure 6:
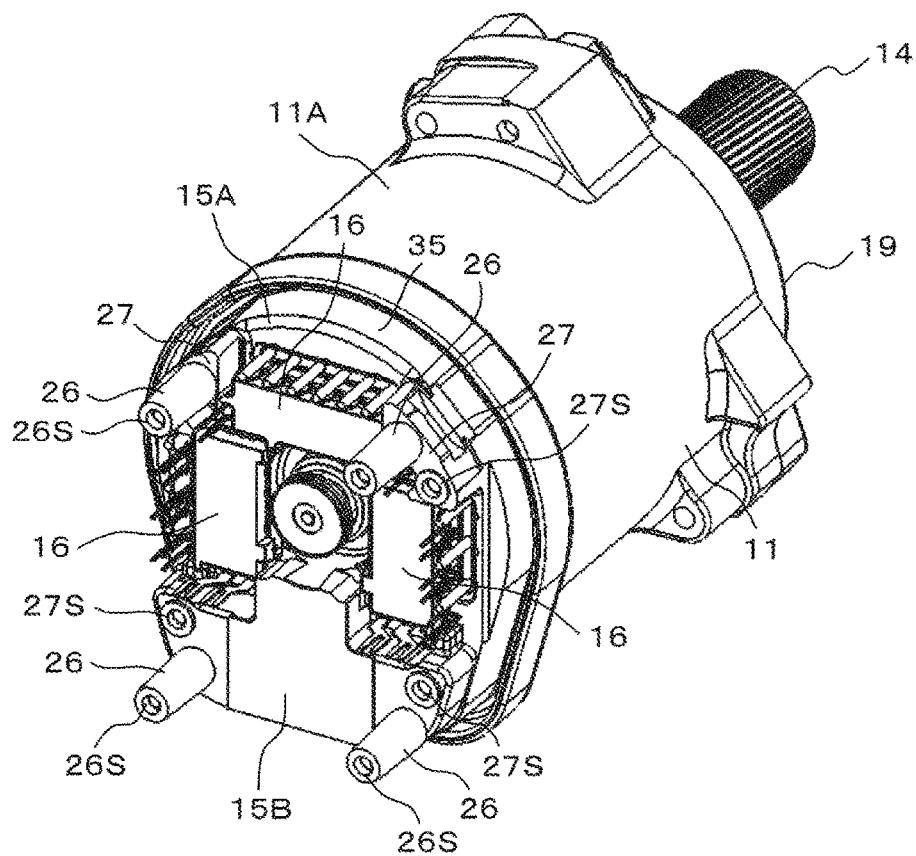
FIG. 6 is a perspective view of the motor housing shown in FIG. 4 where a power conversion circuit part is mounted and fixed to the motor housing.

FIG. 6 shows a state where power conversion circuit part 16 is placed on heat dissipation projecting parts 28 (see FIG. 4). As shown in FIG. 6, power conversion circuit part 16, which is configured to be redundant, is placed on heat dissipation projecting parts 28 (see FIG. 4) formed in power conversion heat dissipation region 15A. The switching elements constituting the power conversion circuit part 16 are mounted on the metal board which is made of an aluminum-based metal in this example, promoting heat dissipation. The metal board is welded to heat dissipation projecting part 28 by friction stir welding.

The metal board may be replaced with a glass epoxy board. In this case, heat dissipation can be enhanced by setting the thickness of the glass epoxy board as thin as possible.

In this way, the metal board is securely fixed to heat dissipation projecting part 28 (see FIG. 4), to allow generated heat of the switching elements to be transferred to heat dissipation projecting part 28 (see FIG. 4) effectively. The heat transferred to heat dissipation projecting part 28 (see FIG. 4) is dissipated to power conversion heat dissipation region 15A, and then to lateral peripheral part 11A of motor housing 11, and finally to the outside. As described above, power conversion circuit part 16 is prevented from interfering with power supply circuit part 17 described below, because the height of power conversion circuit part 16 is shorter than that of power supply heat dissipation region 15B in the axial direction.

As described above, power conversion circuit part 16 is placed on heat dissipation projecting part 28 formed in the power conversion heat dissipation region 15A. Therefore, the heat generated by the switching elements of power conversion circuit part 16 can be efficiently transferred to heat dissipation projecting part 28. Furthermore, the heat transferred to heat dissipation projecting part 28 is dissipated to power conversion heat dissipation region 15A, and transferred to lateral peripheral part 11A of motor housing 11, and dissipated to the outside.

Figure 7:
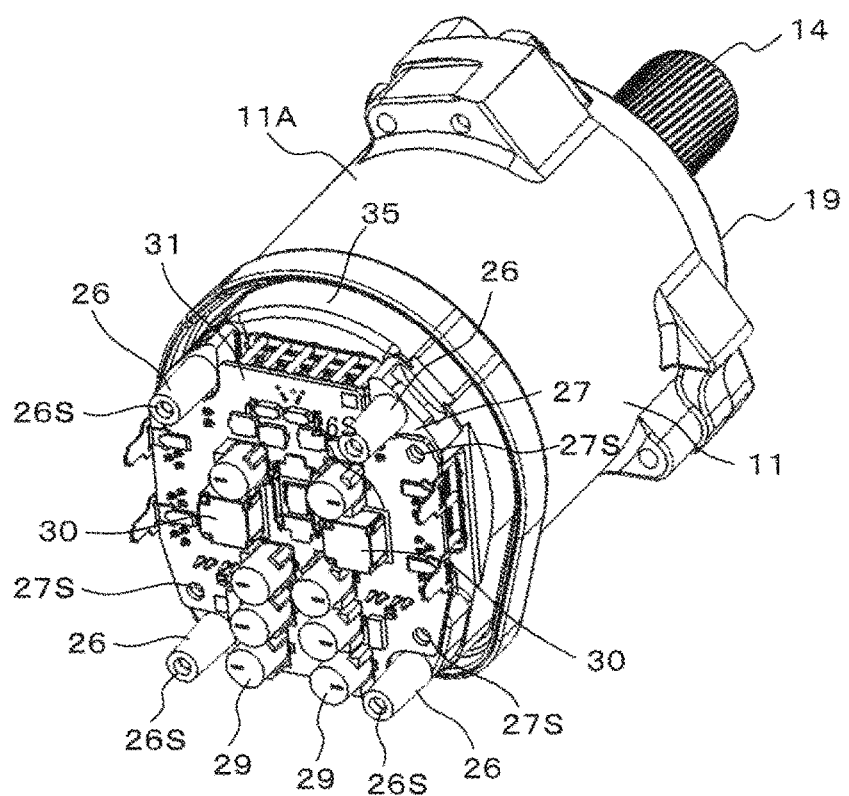
FIG. 7 is a perspective view of the motor housing shown in FIG. 6 where a power supply circuit part is mounted and fixed to the motor housing.

FIG. 7 shows a state where power supply circuit part 17 is placed over power conversion circuit part 16. As shown in FIG. 7, power supply heat dissipation region 15B is covered by power supply circuit part 17. Capacitors 29 and coils 30 of power supply circuit part 17 are placed on glass epoxy board 31. Power supply circuit part 17 is also configured to be redundant and include power supply circuits each of which is composed of capacitors 29 and coil 30 and arranged symmetrically with each other as shown in FIG. 7. Electric elements such as capacitors other than the switching elements of power conversion circuit part 16 are mounted on glass epoxy board 31.

The surface of glass epoxy board 31 facing the power supply heat dissipation region 15B (see FIG. 6) is fixed to end face part 15, in contact with power supply heat dissipation region 15B. As shown in FIG. 7, this fixing is implemented by putting a fixing screw not shown into a screw hole 27S formed in each board-receiving part 27 of board-fixing projecting part 26, and also putting a fixing screw not shown into a screw hole formed in power supply heat dissipation region 15B (see FIG. 6).

The configuration that power supply circuit part 17 is based on glass epoxy board 31 allows the components of power supply circuit part 17 to be mounted on both sides of the power supply circuit part 17. The surface of glass epoxy board 31 facing the power supply heat dissipation region 15B (see FIG. 6) is provided with a rotational phase and speed sensing part composed of the GMR element and a sensing circuit not shown. This sensor is configured to sense the rotational phase and speed of rotating shaft 23 (see FIG. 5) in cooperation with rotation-sensing target part 24 (see FIG. 5) that is provided at rotating shaft 23.

The configuration that glass epoxy board 31 is fixed to power supply heat dissipation region 15B (see FIG. 6), in contact with power supply heat dissipation region 15B as described above, allows the generated heat of power supply circuit part 17 to be transferred to power supply heat dissipation region 15B effectively. The heat transferred to power supply heat dissipation region 15B (see FIG. 6) is transferred and spread into lateral peripheral part 11A of motor housing 11, and then dissipated to the outside. In order to enhance the thermal conductivity, an adhesive agent or dissipation grease or dissipation sheet having a high thermal conductivity may be disposed between glass epoxy board 31 and power supply heat dissipation region 15B (see FIG. 6).

As described above, power supply circuit part 17 is placed on power supply heat dissipation region 15B. The surface of glass epoxy board 31 facing the power supply heat dissipation region 15B, on which the circuit elements of power supply circuit part 17 are mounted, is fixed to end face part 15, in contact with power supply heat dissipation region 15B. Therefore, the heat generated in power supply circuit part 17 can be effectively transferred to power supply heat dissipation region 15B. The heat transferred to power supply heat dissipation region 15B is transferred and spread into lateral peripheral part 11A of motor housing 11, and dissipated to the outside.

Figure 8:
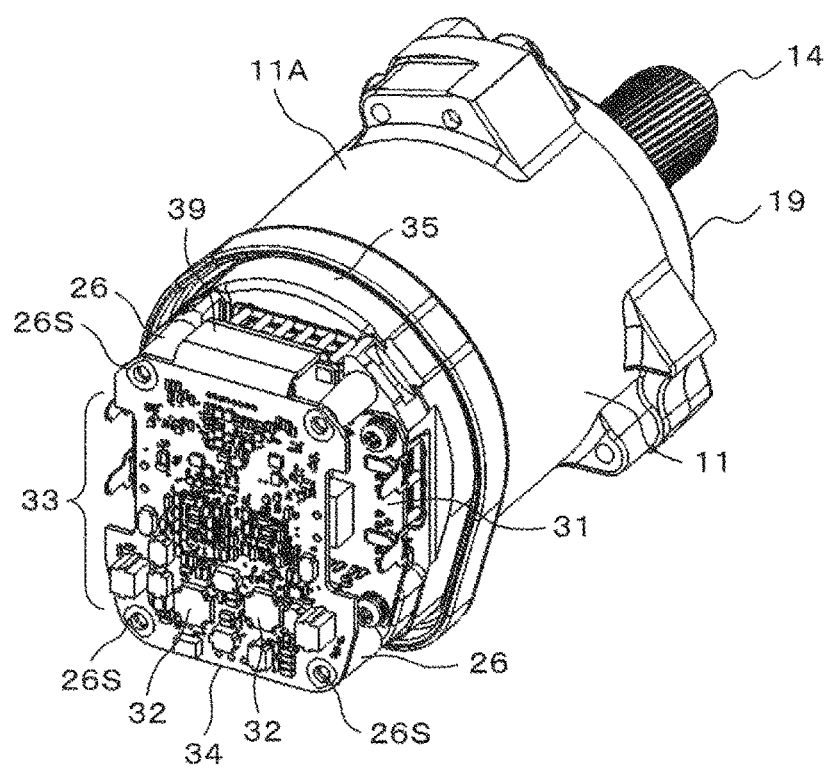
FIG. 8 is a perspective view of the motor housing shown in FIG. 7 where a control circuit part is mounted and fixed to the motor housing.

FIG. 8 shows a state where control circuit part 18 is placed over the power supply circuit part 17. As shown in FIG. 8, control circuit part 18 is arranged over power supply circuit part 17. Microcomputers 32 and peripheral circuits 33 constituting the control circuit part 18 are placed on a glass epoxy board 34. Control circuit part 18 is also configured to be redundant and include control circuits each of which is composed of microcomputer 32 and peripheral circuits 33 and arranged symmetrically with each other as shown in FIG. 8. Microcomputers 32 and peripheral circuits 33 may be placed on the surface of glass epoxy board 34 facing the power supply circuit part 17.

As shown in FIG. 8, glass epoxy board 34 is fixed by fixing screws not shown through the screw holes formed in the top portions of board-fixing projecting parts 26 (see FIG. 7), wherein glass epoxy board 34 is sandwiched between board-fixing projecting parts 26 and connector assembly 13. The space between glass epoxy board 31 of power supply circuit part 17 (see FIG. 7) and glass epoxy board 34 of control circuit part 18 is used for arrangement of capacitors 29 and coils 30 of power supply circuit part 17 shown in FIG. 7.

Next, FIG. 9 shows a state in which connector assembly 13 is placed from above the control circuit part 18. As shown in FIG. 9, connector assembly 13 is placed over the control circuit part 18. Then, connector assembly 13 is fixed by putting fixing screws 36 into the screw holes each formed in the top of board-fixing projecting part 26, sandwiching the control circuit part 18. In this state, as shown in FIG. 3, connector assembly 13 is electrically connected to power conversion circuit part 16, power supply circuit part 17, and control circuit part 18.

Connector assembly 13 is formed with an annular seal accommodating portion 45 around external terminal forming parts 13A, 13B, 13C, wherein annular seal accommodating portion 45 is recess-shaped in its axial sectional view. Annular seal accommodating portion 45 is filled with a liquid sealing agent, where an annular reinforcing projecting portion 46 is formed at exposure hole 42 of metal cover 12 as described below and accommodated in annular seal accommodating portion 45. Accordingly, annular seal accommodating portion 45, the liquid sealing agent, and annular reinforcing projecting portion 46 ensures liquid tightness between metal cover 12 and connector assembly 13.

Furthermore, open end 37 of metal cover 12 is engaged with step portion 35 of motor housing 11, and is fixed by swaging to motor housing 11 in the fixing region extending circumferentially. As described above, the annular step portion 35 of the motor housing, which is formed in the peripheral surface of end face part 15, and the open end 37 of metal cover 12 are engaged with each other by so-called spigot engagement or spigot fitting.

FIG. 10 shows an enlarged sectional view of the electronic control section and its surroundings before metal cover 12 is attached.

At end face part 15 of motor housing 11, power conversion circuit part 16, power supply circuit part 17, and control circuit part 18, which constitute the electronic control part, are layered with each other in this order away from end face part 15. Connector assembly 13 is arranged on the side of the control circuit part 18 opposite to the side facing the power supply circuit part 17. However, the order of arrangement of power conversion circuit part 16, power supply circuit part 17, and control circuit part 18 may be arbitrarily selected, if the electronic control part is arranged between connector assembly 13 and end face part 15.

A plurality of swaging fixation portions 38 are formed in the side surface of step portion 35 of end face part to which opening end 37 of metal cover 12 is fixed. Swaging fixation portion 38 includes a swaging recess 40 that is a swaging groove or recess formed in a fixation wall 39 extending in the axial direction from the annular step portion 35 toward connector assembly 13, wherein step portion 35 is formed in end face part 15 of motor housing 11. Metal cover 12 is fixed by swaging the wall of metal cover 12 into swaging recess 40 with a pressing tool for pressing and plastically deforming the wall of metal cover 12.

Furthermore, the opening end 37 of metal cover 12, and the wall surface extending from the annular step portion 35 to fixation wall 39 form an annular space G, which is filled with a liquid sealing agent 41 for liquid tightness without any gap. This forms a seal region for liquid tightness between the end face part 15 and the open end 37 of the metal cover 12, and prevents entrance of moisture and others by this seal region. This serves to prevent entrance of moisture and others into swaging fixation portion 38, and thereby suppress corrosion of swaging fixation portion 38, and enhance the mechanical reliability. This further serves to prevent entrance of moisture and others into electronic control section 9, and thereby enhance the electrical reliability as well.

In the present embodiment, swaging recesses 40 each having a predetermined length are arranged at places as required (three places). The wall of metal cover 12 pressed in each swaging recess 40 serves to suppress movement of metal cover 12 in the rotational direction and in the axial direction of rotating shaft 23 with respect to motor housing 11.

In the region of connector assembly 13 surrounding the external terminal forming parts 13A, 13B, 13C, annular seal accommodating portion 45 is formed continuously. Annular seal accommodating portion 45 is formed in a groove shape in the surface 47 facing the bottom part 44 in a state where connector assembly 13 faces bottom part 44 of metal cover 12. The cross section of the groove may have a rectangular shape, a semicircular shape, or an arc shape.

Annular seal accommodating portion 45 is an annular groove having an opening facing away from the end face part 15 of motor housing 11 in the axial direction of rotating shaft 23. Therefore, the annular groove is formed along the axis of rotating shaft 23.

Furthermore, annular seal accommodating portion 45 is filled with a liquid sealing agent for ensuring liquid tightness, when metal cover 12 is assembled. Furthermore, the depth of the groove forming the annular seal accommodating portion 45 is determined by the length of annular reinforcing projecting portion 46 formed at the edge of exposure hole 42 of metal cover 12 as described below.

FIGS. 11 and 12 show metal cover 12 according to the present embodiment. Metal cover 12 includes a lateral peripheral part 43 and a bottom part 44, wherein bottom part 44 is formed by bending from one end of lateral peripheral part 43, and wherein bottom part 44 is formed with exposure hole 42 through which external terminal forming parts 13A, 13B, and 13C of connector assembly 13 are exposed to the outside. Furthermore, opening end 37 is formed on the side opposite to bottom part 44, and is engaged with the end face part 15 of motor housing 11.

In a region of metal cover 12 close to the open end 37, three swaging recesses 48 are formed. By pressing the swaging tool onto the swaging recess 48, the wall of metal cover 12 is plastically deformed and fixed by swaging to swaging fixation portion 38 shown in FIG. 10.

Exposure hole 42 is formed near the center of bottom part 44 for exposing the external terminal forming parts 13A, 13B, and 13C of connector assembly 13 to the outside. Furthermore, at the peripheral edge of exposure hole 42 (in other words, at the inner periphery of bottom part 44 forming the exposure hole 42), annular reinforcing projecting portion 46 is formed by bending toward the inside of metal cover 12. Annular reinforcing projecting portion 46 may be formed by drawing the metal cover 12.

Annular reinforcing projecting portion 46 has a shape extending in the axial direction of rotating shaft 23 with metal cover 12 mounted to end face part 15, so that annular reinforcing projecting portion 46 corresponds in position to the groove of annular seal accommodating portion 45. Namely, annular reinforcing projecting portion 46 is substantially parallel to the side walls forming the groove of annular seal accommodating portion 45.

The axial length of annular reinforcing projecting portion 46 is determined such that annular reinforcing projecting portion 46 is out of intimate contact with the bottom face of the groove forming the annular seal accommodating portion 45. This ensures a margin for axial dimensional control of annular reinforcing projecting portion 46 and annular seal accommodating portion 45, and further allows a liquid sealing agent to be interposed between annular reinforcing projecting portion 46 and the inner wall surfaces of annular seal accommodating portion 45, ensuring a function of liquid tightness.

FIG. 13 shows a cross-sectional view of metal cover 12 when metal cover 12 is fixed by swaging to the end face part 15 of motor housing 11.

Before swaging and fixing the metal cover 12 to the end face part 15 of motor housing 11, the inside of annular seal accommodating portion 45 formed in connector assembly 13 is filled with liquid sealing agent 49. Then, when metal cover 12 is assembled so as to cover the electronic control section 9, annular reinforcing projecting portion 46 formed in bottom part 44 of metal cover 12 is inserted and accommodated in annular seal accommodating portion 45 formed in the connector assembly 13.

In this state, by pressing the swaging tool onto the swaging recess 48 of metal cover 12, the wall of metal cover 12 is plastically deformed and fixed by swaging to swaging fixation portion 38 (see FIG. 10). During this operation, an external force due to swaging may act on metal cover 12 to deform exposure hole 42 and its vicinity of metal cover 12. However, in the present embodiment, the formation of annular reinforcing projecting portion 46 serves to enhance the mechanical strength of exposure hole 42 and its vicinity, and suppress deformation of exposure hole 42 and its vicinity and deformation of metal cover 12.

As shown in FIG. 13, annular reinforcing projecting portion 46 is accommodated in annular seal accommodating portion 45 with a predetermined gap to each inner wall surface of annular seal accommodating portion 45, wherein the gap is filled with liquid sealing agent 49. This ensures sufficient liquid tightness in this place. The outer surface of liquid sealing agent 49 filled inside the annular reinforcing projecting portion 46 exceeds the surface of bottom part 44 of metal cover 12 by a thickness (t).

Accordingly, no dent is formed between liquid sealing agent 49 and the wall surface of annular reinforcing projecting portion 46 housed in annular seal accommodating portion 45, allowing moisture to flow from the outside toward the bottom part 44, and thereby suppress corrosion of annular reinforcing projecting portion 46. If it is exposed to salt water or the like in particular, it promotes corrosion. However, this configuration serves to suppress such corrosion.

The further configuration that annular reinforcing projecting portion 46 is formed at the peripheral edge of exposure hole 42 formed in bottom part 44 of metal cover 12, serves to increase the mechanical strength of the periphery of exposure hole 42. Accordingly, even if an external force is applied to metal cover 12 in the process of assembling the metal cover or in the process of actual use, it is possible to suppress deformation of the vicinity of the peripheral edge of exposure hole 42 and deformation of metal cover 12.

For example, as described above, when metal cover 12 is fixed by swaging to the end face part 15 of motor housing 11, the swaging operation may cause an external force to act on exposure hole 42 of metal cover 12 so as to deform the peripheral region of exposure hole 42. However, the formation of annular reinforcing projecting portion 46 serves to suppress deformation of the peripheral region of exposure hole 42.

In this way, the feature that annular reinforcing projecting portion 46 is formed at the edge of exposure hole 42 formed in bottom part 44 of metal cover 12, and accommodated in annular seal accommodating portion 45 formed around external terminal forming parts 13A, 13B, 13C of connector assembly 13, serves to enhance the mechanical strength of the surrounding region of exposure hole 42, and thereby suppress deformation of metal cover 12.

In the present embodiment, annular reinforcing projecting portion 46 is formed by drawing the metal cover 12, but annular reinforcing projecting portion 46 may be provided by preparing a separate reinforcing projecting portion, and fixing it to bottom part 44 of metal cover 12 by welding, forging, etc. Furthermore, although annular reinforcing projecting portion 46 is formed simultaneously with formation of exposure hole 42, it is also possible to form an annular reinforcing projecting portion, which has a shape corresponding to annular seal accommodating portion 45, in the peripheral region around exposure hole 42.

Liquid sealing agents 41 and 49 for liquid tightness, which are filled respectively between metal cover 12 and end face part 15 and between metal cover 12 and connector assembly 13, are implemented by an adhesive synthetic resin. In the present embodiment, liquid sealing agents 41 and 49 are implemented by a silicone-rubber-based elastic adhesive that is cured at room temperature or is cured by heating. This silicone-rubber-based elastic adhesive has a property of absorbing stress such as external vibration and impact, and is less subject to stress concentration on the adhesive interface. When an electric power steering device is subject to vibration, impact, etc., peeling may occur at the adhesive interface and the function of liquid tightness may be lost. However, the use of a silicone-rubber-based elastic adhesive serves to reduce the risk of loss of the function of liquid tightness.

Furthermore, in the present embodiment, the feature that the sealing is implemented by adhesive liquid sealing agents 41 and 49 allows the use of a liquid-tightening O-ring to be omitted. Liquid sealing agents 41 and 49 may be implemented by a liquid gasket (FIPG: Formed In Place Gasket) having an adhesive function, and may be implemented by a material that can be cured at room temperature or by heating.

By this configuration, it is possible to prevent moisture from entering the inside through the vicinity of abutment between annular reinforcing projecting portion 46 at exposure hole 42 formed in bottom part 44 of metal cover 12 and annular seal accommodating portion 45 of connector assembly 13. Also, it is possible to prevent moisture from entering the inside through the vicinity of the place of engagement between open end 37 of metal cover 12 and step portion 35 of end face part 15 of motor housing 11.

As described above, the present invention is characterized by including: a motor housing structured to house an electric motor, wherein the motor housing includes an end face part opposite to an output part of a rotating shaft of the electric motor, and wherein the electric motor is structured to drive a controlled object of a mechanical system; an electronic control part arranged at the end face part of the motor housing; a connector assembly arranged on a side of the electronic control part opposite to a side of the electronic control part that faces the end face part of the motor housing; and a metal cover structured to cover the electronic control part from outside, wherein the metal cover includes: a bottom part including: an exposure hole through which an external terminal forming part is exposed to outside; and an annular reinforcing projecting portion formed at an edge of the exposure hole, and accommodated in an annular seal accommodating portion; and a lateral peripheral part angled from the bottom part, and forming an opening through which the lateral peripheral part is fixed to the end face part of the motor housing.

According to the foregoing, the feature that the annular reinforcing projecting portion is formed at the edge of the exposure hole formed in the bottom part of the metal cover, serves to enhance the mechanical strength of the surrounding region of the exposure hole, and thereby suppress the deformation of the metal cover.

The present invention is not limited to the embodiment described above, but includes various modified embodiments. The described embodiment is detailed merely for easy understanding of the present invention, and the present invention is not limited to a form including all of the features described above, for example. Part of features of one of the embodiments may be replaced with features of another one of the embodiments. Features of one of the embodiments may be additionally provided with features of another one of the embodiments. Part of features of each of the embodiments may be additionally provided with other features or removed or replaced.

The electric drive device according to the embodiment described above may be exemplified as follows.

According to one aspect, an electric drive device includes: a motor housing structured to house an electric motor, wherein the motor housing includes an end face part opposite to an output part of a rotating shaft of the electric motor, and wherein the electric motor is structured to drive a controlled object of a mechanical system; an electronic control part arranged at the end face part of the motor housing; a connector assembly arranged on a side of the electronic control part opposite to a side of the electronic control part that faces the end face part of the motor housing; and a metal cover structured to cover the electronic control part from outside, wherein the metal cover includes: a bottom part including: an exposure hole through which an external terminal forming part is exposed to outside; and an annular reinforcing projecting portion formed at an edge of the exposure hole; and a lateral peripheral part angled from the bottom part, and forming an opening through which the lateral peripheral part is fixed to the end face part of the motor housing.

According to a preferable aspect, the electric drive device is configured such that the annular reinforcing projecting portion angled from a portion of the bottom part that defines the exposure hole.

According to another preferable aspect, the electric drive device according to one of the foregoing aspects is configured such that the annular reinforcing projecting portion is accommodated in an annular seal accommodating portion that is formed around the external terminal forming part and filled with a liquid sealing agent.

According to a further preferable aspect, the electric drive device according to one of the foregoing aspects is configured such that the end face part of the motor housing includes a swaging recess; and the metal cover includes a wall face pressed and swaged into the swaging recess for fixation of the metal cover to the end face part of the motor housing.

According to a further preferable aspect, the electric drive device according to one of the foregoing aspects is configured such that the annular seal accommodating portion is recess-shaped in a cross sectional view taken along a plane in an axial direction of the rotating shaft; the annular reinforcing projecting portion is accommodated in the annular seal accommodating portion with a predetermined clearance to an inner wall surface of the annular seal accommodating portion; and the clearance is filled with the liquid sealing agent.

According to a further preferable aspect, the electric drive device according to one of the foregoing aspects is configured such that the liquid sealing agent located radially inside the annular reinforcing projecting portion has an outer surface projecting beyond a surface of the bottom part of the metal cover.

According to a further preferable aspect, the electric drive device according to one of the foregoing aspects is configured such that a space between the end face part of the motor housing and the opening of the metal cover is filled with the liquid sealing agent.

The electric power steering device according to the embodiment described above may be exemplified as follows.

According to one aspect, an electric power steering device includes: an electric motor structured to apply a steering assist force to a steering shaft, depending on an output from a torque sensor, wherein the torque sensor is structured to sense a direction of rotation of the steering shaft and a rotating torque applied to the steering shaft; a motor housing structured to house the electric motor, wherein the motor housing includes an end face part opposite to an output part of a rotating shaft of the electric motor; an electronic control part arranged at the end face part of the motor housing; a connector assembly arranged on a side of the electronic control part opposite to a side of the electronic control part that faces the end face part of the motor housing; and a metal cover structured to cover the electronic control part from outside, wherein the metal cover includes: a bottom part including: an exposure hole through which an external terminal forming part is exposed to outside; and an annular reinforcing projecting portion formed at an edge of the exposure hole; and a lateral peripheral part angled from the bottom part, and forming an opening through which the lateral peripheral part is fixed to the end face part of the motor housing.

According to a preferable aspect, the electric power steering device is configured such that the annular reinforcing projecting portion angled from a portion of the bottom part that defines the exposure hole.

According to another preferable aspect, the electric power steering device according to one of the foregoing aspects is configured such that the annular reinforcing projecting portion is accommodated in an annular seal accommodating portion that is formed around the external terminal forming part and filled with a liquid sealing agent.

According to a further preferable aspect, the electric power steering device according to one of the foregoing aspects is configured such that the end face part of the motor housing includes a swaging recess; and the metal cover includes a wall face pressed and swaged into the swaging recess for fixation of the metal cover to the end face part of the motor housing.

According to a further preferable aspect, the electric power steering device according to one of the foregoing aspects is configured such that the annular seal accommodating portion is recess-shaped in a cross sectional view taken along a plane in an axial direction of the rotating shaft; the annular reinforcing projecting portion is accommodated in the annular seal accommodating portion with a predetermined clearance to an inner wall surface of the annular seal accommodating portion; and the clearance is filled with the liquid sealing agent.

According to a further preferable aspect, the electric power steering device according to one of the foregoing aspects is configured such that the liquid sealing agent located radially inside the annular reinforcing projecting portion has an outer surface projecting beyond a surface of the bottom part of the metal cover.

According to a further preferable aspect, the electric power steering device according to one of the foregoing aspects is configured such that a space between the end face part of the motor housing and the opening of the metal cover is filled with the liquid sealing agent.

The invention claimed is:

1. An electric drive device comprising:
    a motor housing structured to house an electric motor, wherein the motor housing includes an end face part opposite to an output part of a rotating shaft of the electric motor, and wherein the electric motor is structured to drive a controlled object of a mechanical system;
    an electronic control part arranged at the end face part of the motor housing;
    a connector assembly arranged on a side of the electronic control part opposite to a side of the electronic control part that faces the end face part of the motor housing, wherein the connector assembly includes an annular seal accommodating portion formed around an external terminal forming part and recess-shaped in a cross sectional view taken along a plane in an axial direction of the rotating shaft; and
    a metal cover structured to cover the electronic control part from outside, wherein the metal cover includes:
        a bottom part including:
            an exposure hole through which the external terminal forming part is exposed to outside; and
            an annular reinforcing projecting portion formed at an edge of the exposure hole; and
        a lateral peripheral part angled from the bottom part, and forming an opening through which the lateral peripheral part is fixed to the end face part of the motor housing, wherein:
    the annular seal accommodating portion is filled with a liquid sealing agent;
    the annular reinforcing projecting portion is accommodated in the annular seal accommodating portion with a predetermined clearance to an inner wall surface of the annular seal accommodating portion; and
    the liquid sealing agent includes a portion located radially inside the annular reinforcing projecting portion, wherein the portion of the liquid sealing agent extends from the annular seal accommodating portion to an outer surface of the bottom part of the metal cover, wherein the outer surface of the bottom part of the metal cover faces outwardly in the axial direction of the rotating shaft, and the portion of the liquid sealing agent has an outer surface projecting beyond the outer surface of the bottom part of the metal cover, and is partly layered on the outer surface of the bottom part of the metal cover in the axial direction of the rotating shaft.

2. The electric drive device as claimed in claim 1, wherein the annular reinforcing projecting portion is angled from a portion of the bottom part that defines the exposure hole.

3. The electric drive device as claimed in claim 1, wherein:
    the end face part of the motor housing includes a swaging recess; and
    the metal cover includes a wall face pressed and swaged into the swaging recess for fixation of the metal cover to the end face part of the motor housing.

4. The electric drive device as claimed in claim 1, wherein a space between the end face part of the motor housing and the opening of the metal cover is filled with the liquid sealing agent.

5. An electric power steering device comprising:
    an electric motor structured to apply a steering assist force to a steering shaft, depending on an output from a torque sensor, wherein the torque sensor is structured to sense a direction of rotation of the steering shaft and a rotating torque applied to the steering shaft;
    a motor housing structured to house the electric motor, wherein the motor housing includes an end face part opposite to an output part of a rotating shaft of the electric motor;
    an electronic control part arranged at the end face part of the motor housing;
    a connector assembly arranged on a side of the electronic control part opposite to a side of the electronic control part that faces the end face part of the motor housing, wherein the connector assembly includes an annular seal accommodating portion formed around an external terminal forming part and recess-shaped in a cross sectional view taken along a plane in an axial direction of the rotating shaft; and
    a metal cover structured to cover the electronic control part from outside, wherein the metal cover includes:
        a bottom part including:
            an exposure hole through which the external terminal forming part is exposed to outside; and
            an annular reinforcing projecting portion formed at an edge of the exposure hole; and
        a lateral peripheral part angled from the bottom part, and forming an opening through which the lateral peripheral part is fixed to the end face part of the motor housing, wherein:
    the annular seal accommodating portion is filled with a liquid sealing agent;

the annular reinforcing projecting portion is accommodated in the annular seal accommodating portion with a predetermined clearance to an inner wall surface of the annular seal accommodating portion; and the liquid sealing agent includes a portion located radially inside the annular reinforcing projecting portion, wherein the portion of the liquid sealing agent extends from the annular seal accommodating portion to an outer surface of the bottom part of the metal cover, wherein the outer surface of the bottom part of the metal cover faces outwardly in the axial direction of the rotating shaft, and the portion of the liquid sealing agent has an outer surface projecting beyond the outer surface of the bottom part of the metal cover, and is partly layered on the outer surface of the bottom part of the metal cover in the axial direction of the rotating shaft.

6. The electric power steering device as claimed in claim 5, wherein the annular reinforcing projecting portion is angled from a portion of the bottom part that defines the exposure hole.

7. The electric power steering device as claimed in claim 5, wherein:
   the end face part of the motor housing includes a swaging recess; and
   the metal cover includes a wall face pressed and swaged into the swaging recess for fixation of the metal cover to the end face part of the motor housing.

8. The electric power steering device as claimed in claim 5, wherein a space between the end face part of the motor housing and the opening of the metal cover is filled with the liquid sealing agent.

* * * * *